United States Patent

[11] 3,553,407

| [72] | Inventor | Richard Hauser<br>Pittsburgh, Pa. |
|---|---|---|
| [21] | Appl. No. | 778,374 |
| [22] | Filed | Oct. 24, 1968 |
| [45] | Patented | Jan. 5, 1971 |
| [73] | Assignee | Westinghouse Electric Corporation<br>Pittsburgh, Pa.<br>a corporation of Pennsylvania |

[54] DISCONNECTING CONTACT ASSEMBLY
7 Claims, 11 Drawing Figs.

| [52] | U.S. Cl. | 200/166 |
|---|---|---|
| [51] | Int. Cl. | H01h 1/46 |
| [50] | Field of Search | 200/166B8,<br>166B5, 166B6, 168A, 50.15, 166E, 166D;<br>317/103 |

[56] References Cited
UNITED STATES PATENTS

| 2,388,934 | 11/1945 | Pearson | 200/168(A) |
|---|---|---|---|
| 2,689,898 | 9/1954 | West | 200/168(A) |
| 3,015,756 | 1/1962 | Kreekon et al. | 200/50(.15)(X) |

*Primary Examiner*—H. O. Jones
*Attorneys*—A. T. Stratton and Clement L. Mc Hale ABSTRACT: A secondary disconnecting contact means for use with electrical apparatus such as circuit breakers or switches comprising separable relatively movable and stationary contact assemblies each including a plurality of contact members mounted on an insulating support or housing.

DISCONNECTING CONTACT ASSEMBLY

BACKGROUND OF THE INVENTION

This invention relates to switchgear apparatus and more particularly to secondary disconnecting contact assemblies for metal enclosed switchgear having circuit interrupters or circuit breakers of the drawout type. In such apparatus, secondary disconnecting contacts are usually provided for the control circuit wires which are electrically connected to each drawout circuit interrupter unit. Secondary disconnecting contacts which have been employed in the past have certain disadvantages in that they are somewhat complicated in construction or that the relative size of certain parts is larger than is desirable in certain applications of such contacts. Examples of such secondary disconnecting contacts are disclosed in U.S. Pat. No. 2,689,898 which issued Sept. 21, 1954 to C. P. West and which is assigned to the same assignee as the present application, in U.S. PAT. No. 2,794,873 which issued June 4, 1957 to T. G. Bank and in U.S. Pat. No. 2,917,592 which issued Dec. 15, 1959 to J. C. Craig et al.

SUMMARY OF THE INVENTION

In accordance with the invention, a secondary disconnecting contact assembly comprises a housing or support member which is formed from an electrically insulating material and which includes a plurality of openings or recesses disposed in side-by-side relation. A contact member or finger is partially disposed in one or more of the openings with the contact member being pivotally supported adjacent to one end thereof by a portion of the support member. The contact member also includes adjacent to the other end a generally arcuate or curved contact portion which projects or extends externally of the opening in the associated insulating support. In certain embodiments, a biasing means is provided in the opening between the contact member and an additional portion of the insulating support member to bias the contact portion of the contact member outwardly with respect to the associated opening. In order to limit the outward movement of the contact portion of the contact member under the influence of the biasing means where provided, the contact member includes projecting portions which engage a further portion of the insulating support member in at least one operating position of the overall contact assembly. The contact assembly includes means for transferring current to each contact member adjacent to the portion of the contact member at which the pivotal support is provided.

It is therefore an object of the invention to provide a simple and more compact disconnecting contact assembly of the type described.

BRIEF DESCRIPTION OF THE DRAWINGS.

Other objects of the invention will be apparent from the following detailed description taken in conjunction with the accompanying drawings, in which.

DESCRIPTION OF THE PREFERRED EMBODIMENTS

Figure 1:
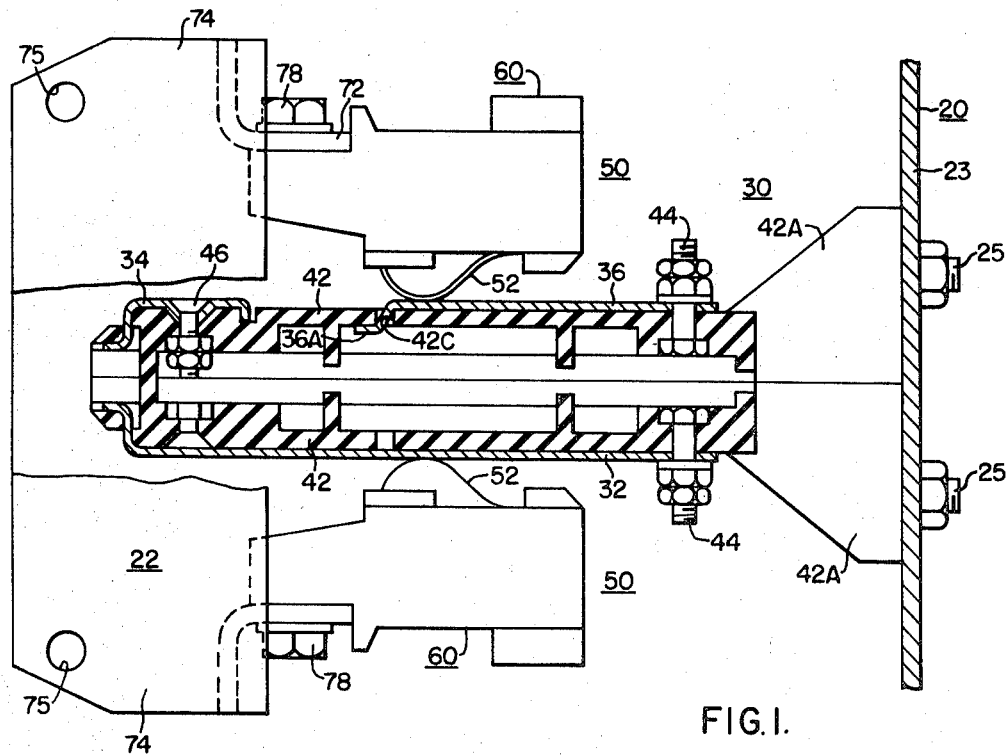
FIG. 1 is a view, partly in side elevation and partly in section, of a secondary disconnecting contact assembly embodying the invention along with a portion of an associated drawout circuit breaker and the cubicle or housing in which the circuit breaker is normally disposed.
Figure 2:
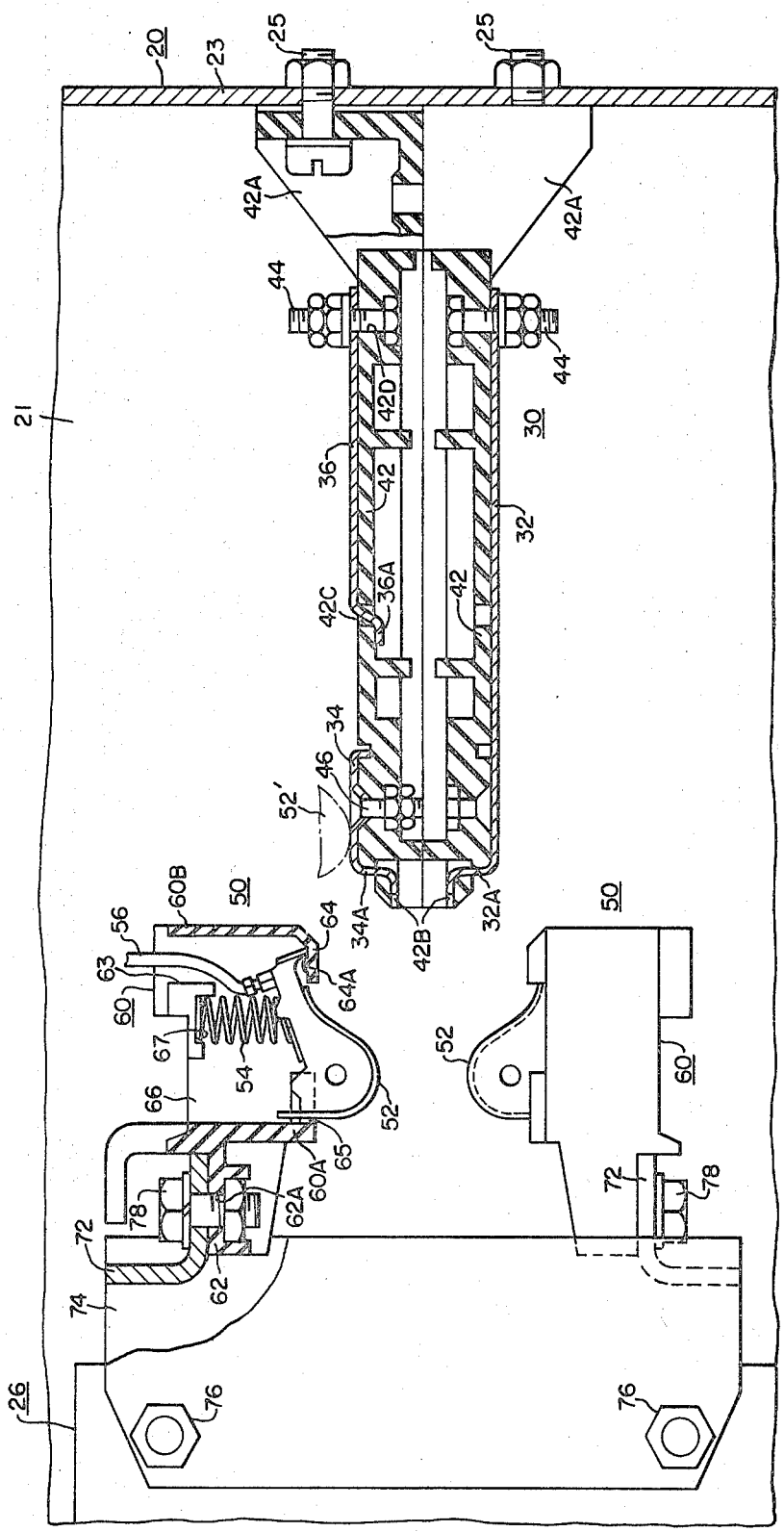
FIG. 2 a view similar to FIG. 1 showing the secondary disconnecting contact assembly when the associated circuit breaker unit is the disconnected or withdrawn position.

Referring now to the drawings and FIGS. 1 and 2 in particular, the structure shown therein comprises a metal enclosed switchgear cell or cubicle 20 in which is disposed a circuit breaker unit 26. The cubicle 20 may be part of a metal enclosed switchgear unit which may be of the construction which is fully described in the above-mentioned West patent or in copending application Ser. No. 788,176 filed Dec. 31, 1968 by Fred Bould which are both assigned to the same assignee as the present application. As shown in FIG. 2, the cubicle 20 includes a pair of spaced sidewalls or sheets 21 (only one shown), a rear panel or metal late member 23 which may be attached to the side sheets 21 directly or indirectly, top an bottom walls (not shown) and a door or cover (not shown) which is provided at the front of the cubicle 20 thereby completing the enclosure for the circuit breaker unit 26.

The circuit breaker unit 26 may be of the horizontal drawout type such as fully described in U.S. Pat. No. 2,777,024 which issued Jan. 8, 1957 to C. P. West or in copending application Ser. NO. 770,296 filed Oct. 24, 1968 filed concurrently by F. Bould, J. H. Taylor and R. Hauser which are both assigned to the same assignee as the present application. The circuit breaker unit 26 may comprise a circuit breaker which is mounted in a carriage (not shown) and be supported by rollers (not shown) which are attached to the carriage. Where provided, such rollers may run or slide on rails (not shown) disposed at the sides of the cubicle 20.

The circuit breaker unit 26 may be moved rectilinearly between the disconnected position in the cubicle 20, as shown in FIG. 2, and the connected or operating position shown in FIG. 1 by means of a drive mechanism which is fully described in the last-mentioned West patent or in copending application Ser. No. 779,511 filed Nov. 27, 1968 now Pat. No. 3,474,201by F. Bould which is also assigned to the same assignee as the present application. When the circuit breaker unit 26 is in the connected or operating position, as shown in FIG. 1, the movable primary disconnect contact members (not shown) which are carried by the circuit breaker unit 26 engage fixed primary disconnecting contact members (not shown) which are mounted at the rear of the cubicle 20. When the circuit breaker unit 26 is in the disconnected position as shown in FIG. 2, the primary disconnecting contact members of the circuit breaker unit 26 are disengaged from the associated fixed primary disconnecting contact members. The movable primary disconnecting contact members of the circuit breaker unit 26 are also disengaged from the associated fixed primary disconnecting contact members when the circuit breaker unit 26 is in the test position which is intermediate the disconnected position of the circuit breaker unit 26, as shown in FIG. 2, and the connected or operating position of the circuit breaker unit 26, as shown in FIG. 1.

In order to provide the removable circuit breaker unit 26 with secondary disconnecting contact assemblies for establishing the control circuits to the circuit breaker unit 26, the stationary secondary disconnecting contact assembly 50 is disposed in the cubicle 20. The upper and lower movable secondary disconnecting contact assemblies 50 are both mounted on the circuit breaker unit 26 as illustrated in FIGS. 1 and 2.

The stationary secondary contact assembly 30 as illustrated includes a pair of electrically insulating supports or bases 42 which are disposed or mounted in back-to-back relation, as shown in FIG. 2, and which project forward from the rear panel 23 toward the circuit breaker unit 26. The insulating supports 42 are preferably formed or molded from an electrically insulating material having excellent nontracking arc and wear resistance characteristics, such as a glass-polyester material with an aluminum trihydrate filler. As illustrated, the insulating supports 42 include integral bracket or lug portions 42A which may be secured or attached to the rear panel 23 by suitable means, such as the bolts 25, which pass through aligned openings in the bracket portions 42A and the rear panel 23. A plurality of stationary contact fingers or members may be mounted on each of the insulating supports or bases 42 in side-by-side spaced relation, as required in a particular application. Where a particular stationary contact member is to be engaged by the associated movable contact assembly 50 in both the test and connected positions of the associated circuit breaker unit 26, a contact member 32 of a relatively longer size may be provided with one end of the contact member 32 being generally S-shaped in configuration and adapted to be assembled into an opening 42B which is provided at the outer end of the associated insulating support 42. The other end of the contact member 32 which extends from the outer end of the insulating support 42 substantially to the bracket portion 42 of the same insulating support, may be secured to the insulating support 42 by suitable means, such as the terminal screw 44, to which control conductors may be secured by providing additional nuts on the exposed threaded portion of the terminal screw 44, as indicated in FIGS. 1 and 2.

Where a particular stationary contact member is to be engaged by the associated movable contact assembly 50 in only the connected or operating position of the circuit breaker unit 26, a contact member having an intermediate length may be provided, as indicated at 36 in FIG. 2 with one end of the contact member 36, as indicated at 36A, being generally S-shaped in configuration and adapted to be assembled into an opening 42C in the associated insulating support 42. The other end of the contact member 36 may be secured to the insulating support 42 by suitable means, such as the terminal screw 44, which passes through an opening 42D in the insulating support 42 and is adapted to receive associated control conductors by providing additional nuts on the exposed threaded end of the terminal screw 44 which secures the contact member 36 to the associated insulating support 42.

Where a particular stationary contact member is to be engaged by the associated movable disconnecting contact assembly 50 only in the test position of the associated circuit breaker unit 26, a relatively short contact member may be provided as indicated at 34 in FIG. 2 with the outer end of the contact member 34 as indicated at 34A being generally S-shaped in configuration and adapted to be assembled into the opening 42B provided at the outer end of the associated insulating support 42. The relatively short contact member 34 may be secured to the insulating support 42 at its intermediate portion by suitable means, such as the terminal screw 46, which is also adapted to receive removable control conductors by providing additional nuts on the inner threaded portion of the terminal screw 46 as shown in FIG. 2. The other end of the contact member 34 may be adapted to project into the recess provided in the associated insulated support 42 as shown in FIG. 2. In certain applications, it may be desirable that the same contact member or finger 52 of one of the movable contact assemblies 50 independently engage separate stationary contact members which form part of the stationary contact assembly 30 in the test and connected positions, respectively, of the circuit breaker unit 26. In such applications, both a relatively short stationary contact member 34 and an intermediate size contact member 36 may both be provided and positioned in substantial alignment to be engaged by the same movable contact member or finger 52 of the associated movable contact assembly 50, as shown in FIG. 2.

Figure 5:
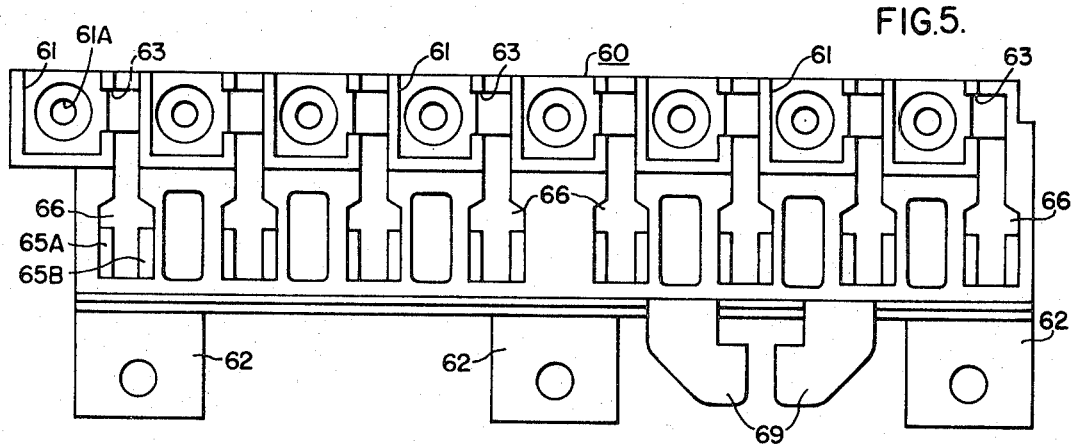
FIG. 5 is a top plan view of an insulating housing or support member which forms part of the moving contact assembly included in the secondary disconnecting contact assembly shown in FIG. 1.

The upper and lower movable contact assemblies 50 each includes an electrically insulating support or housing 60 having a plurality of laterally spaced lug or bracket portion 62, as best shown in FIGS. 2 and 5. The lug portions 62 of the insulating supports 60 may be secured or attached to the angle shaped bracket members 72 which in turn are supported by a pair of spaced side plates 74 with the bracket or cross members 72 being secured to said side plates by suitable means, such as welding. As illustrated, the lug portions 62 of the insulating support 60 of the movable contact assemblies 50 are secured to the bracket members 72 by a plurality of bolts 78, as shown in FIG. 2. The side plates 74 in turn are mounted on and secured to the circuit breaker unit 26 by suitable means, such as the bolts 76 which pass through the openings 75 in said side plates and are secured to the rear of the circuit breaker unit 26, as shown in FIG. 2. The insulating support 60 of each of the movable contact assemblies 50 is also preferably formed or molded from an electrically insulating material having excellent nontracking arc and wear resistant characteristics, such as a glass-polyester material with an aluminum trihydrate filler.

Since the upper and lower movable contact assemblies 50 are identical in construction and merely reversed in orientation in order that the contact members or fingers 52 of each of said contact assemblies properly engage the associated stationary contact assembly 30, only the upper movable contact assembly 50 will be described in detail. As best shown in FIGS. 2 and 5, the insulating support or housing 60 includes a plurality of openings 66 which extend from the top to the bottom of said insulating support as viewed in FIG. 2 and which are disposed in side-by-side spaced relationship between the opposite sidewalls of the insulating support 60, as viewed in FIG. 2. Each of the openings 66 also extends in a direction generally parallel to the line of movement of the associated circuit breaker unit 26 between the rear wall 60A and the front wall 60B of the main body portion of the insulating support or housing 60, as shown in FIG. 2. One or more movable contact members or contact fingers 52 may be disposed in the respective openings 66 to engage corresponding stationary contact members which are provided as part of the stationary contact assembly 30 when the circuit breaker unit 26 is either in the test or connected positions as required in a particular application.

Figure 4:
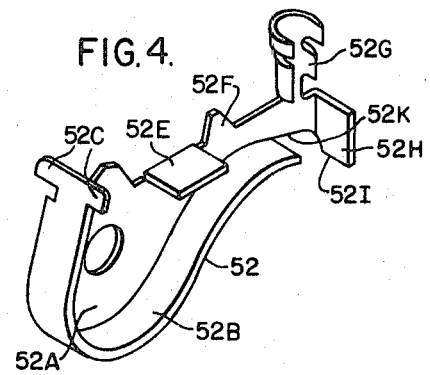
FIG. 4 is a perspective view of a contact member or finger which forms part of a moving contact assembly included in the secondary disconnecting contact assembly shown in FIG. 1.

Referring now to FIG. 4, each movable contact finger or contact member 52 includes a main portion 52A which lies generally in a predetermined plane which is substantially parallel to the line of movement of the circuit breaker unit 26 when the contact member 52 is assembled with the associated insulating support 60. Adjacent to one end of the contact member 52, as shown in FIGS. 2 and 4, a generally arcuate or curved contact portion 52B is provided which may be formed integrally with the main portion 52A of the contact member 52 and it is disposed generally perpendicular to the main portion 52A of the contact member 52. It is to be noted that the contact portion 52B along with part of the main portion 52A of the contact member 52 extends or projects externally of the insulating support 60 when the contact member 52 is assembled with the associated insulating support 60 to engage the associated stationary contact members, as best shown in FIG. 1. In order to pivotally support each contact member 52 adjacent to the other end of the contact member 52 away from the contact portion 52B, the insulating support 60 includes a projecting portion, as indicated at 64 in FIG. 2, which is adapted to be engaged by a tab or end portion of the contact member 52, as indicated at 52H in FIG. 4. The end portion 52H projects away from the plane of the main portion 52A of the contact member 52 at substantially a right angle with the bottom of the end portion 52H, as indicated at 52I, acting as a fulcrum surface during any pivotal movement of the contact member 52. It is to be noted that the raised portion 64A which projects upwardly from the projecting portion of the insulating support 64 assists in providing additional electrical creepage insulation between adjacent movable contact members 52 provided on the insulating support 60.

Figure 3:
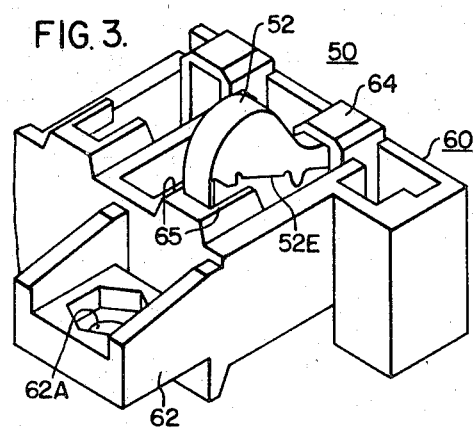
FIG. 3 is a perspective view of a portion of a moving contact assembly which forms part of the overall secondary disconnecting contact assembly shown in FIG. 1.

In order to bias each contact member 52 outwardly from the opening 66 of the support 60 in which the contact member 52 is disposed and to assist in establishing sufficient contact pressure between each movable contact member 52 and the associated stationary contact members when the circuit breaker unit 26 is actuated to either the test or connected positions, a biasing means, such as the compression spring 54, is disposed in each opening 66 between an intermediate portion of the associated contact member 52 and a projecting portion of the insulating support 60, as indicated at 67 in FIG. 2, which is formed with a recess which acts as an upper spring seat for the spring 54, as viewed in FIG. 2. In order to provide a spring seat for the lower end of the spring 54 as viewed in FIG. 2, the intermediate portion of the contact member 52 as shown in FIG. 4 includes a tab portion 52E which extends generally perpendicular to the main portion 52A of the contact member 52 and also includes a projecting portion 52F which assists in keeping the spring 54 in assembled relationship with the associated contact member 52. In order to prevent the contact member 52 from rotating beyond a certain position about the pivot support 64 under the influence of the bias spring 54, the contact member 52 includes a pair of laterally projecting portions 52C which are disposed to engage the projecting portions 65 provided on opposite sides of the opening 66 in which the contact member 52 is disposed, at best shown in FIG. 3, and to act as a stop to limit the movement of each contact member 52 under the influence of the associated bias spring 54 when the complete movable contact assembly 50 is in an operating position which corresponds to the disconnected or withdrawn position of the associated circuit breaker unit 26. The projecting portions 65 also act as a guide means to guide the movement of the associated contact member 52 whenever the contact member 52 is either engaging the associated stationary contact members or is being disengaged from said stationary contact members.

In order to provide means for making an electrical connection from each movable contact member 52 to an associated control conductor, as indicated at 56 in FIG. 2, each contact member 52 includes a projecting portion as indicated at 52G which is adapted to receive an associated control conductor and to permit a crimped or brazed connection to each movable contact member 52. It is important to note that the electrical connection to the contact member 52, as shown in FIG. 2, is immediately adjacent to the pivotal support of the contact member 52 in order to substantially minimize or eliminate any flexing or stressing of the associated control conductor 56 which would be undesirable during extended periods of operation of the overall equipment. It is also to be noted as indicated at 52K that the contact portion 52B of the contact member 52 terminates or stops short of the end portion 52H of the contact member 52 which pivots on the projecting portion 64 of the insulating support 60 in order to avoid any interference with the pivotal movement of the contact member 52 which results during the operation of the overall equipment. It should also be noted that the projecting portions 52C of each contact member 52, as shown in FIGS. 2 and 4, also assist in guiding the pivotal movement of each contact member 52 about the pivotal support 64 included as part of the insulating support 60.

In the operation of the disconnecting contact assemblies previously described, when the circuit breaker unit 26 is moved to the right from the disconnected position shown in FIG. 2, the contact portions 52B of the contact members 52 provided as part of the movable contact assemblies 50 will engage the outer ends of the associated stationary contact members 32 and 34 and the contact members 52 will move pivotally about the respective pivotal support 64 against the forces exerted on said contact members by the associated bias springs 54 until the circuit breaker unit 26 reaches the test position which corresponds to the position of the upper contact member 52 indicated in phantom at 52' in FIG. 2. At that time, the upper contact member 52 will engage the stationary contact member 34 and sufficient contact pressure will be provided by the associated bias spring 54 which will be additionally compressed by the pivotal movement of the upper contact member 52. Similarly, the lower contact member 52 will engage the associated stationary contact member 32 with sufficient contact pressure being provided by the bias spring 54 associated with the lower contact member 52. When the circuit breaker unit 26 is moved rectilinearly farther toward the right to the connected or operating position shown in FIG. 1, the upper contact member 52 will slide along the stationary contact member 34 and the exposed portion of the upper insulating support 42 until the upper contact member 52 engages the stationary contact member 36 with the bias spring 54 continuing to provide sufficient contact pressure between the movable contact member 52 and the associated stationary contact member 36. Similarly, the lower contact member 52 will slidably move along the associated stationary contact member 32 until the lower contact member 52 reaches the operating position shown in FIG. 1. It is important to note that the contact portion 52B of each contact member 52 includes generally arcuate or curved surface on both of the opposite sides thereof which are effective during both the movement of the circuit breaker unit 26 into the connected position and also when the circuit breaker unit 26 is actuated or moved to a disconnected or withdrawn position, as shown in FIG. 2, in order to minimize or eliminate the possibility of the stationary contact members provided as part of the stationary contact assembly 30 from impeding the movement of the associated movable contact members 52 which form part of the upper and lower movable contact assemblies 50 in either direction. As mentioned previously, the electrical connections to the movable contact members 52 are arranged to be adjacent to the point at which each movable contact member 52 is pivotally supported in order to minimize any flexing or movement of the associated control conductors which are secured to the ends of the movable contact members 52, as shown in FIG. 2.

It is important to note that a relatively short lever arm results in the disclosed construction between the point at which each movable contact member 52 is pivotally supported and the portions of said contact member at which forces are exerted on said contact member by the associated stationary contact members during the movement of the circuit breaker unit 26 into or out of the cubicle 20. This means that the effective torque exerted on each contact member 52 is reduced and the corresponding friction on the contact member 52 is reduced compared to known constructions of the same general type. Where desired, a pair of lug or projecting portions 69 as shown in FIGS. 2 and 5 may be formed integrally with the insulating support 60 with a space therebetween on each side of the intermediate lug portion 62 to provide a means for guiding the control conductors to the associated movable contact members, as required in a particular application, in order to more nearly equalize the length of the control conductors for convenience of assembly of the overall movable contact assemblies 50 with the associated circuit breaker unit.

Figure 7:
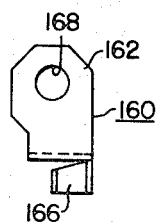
FIG. 7 is a top plan view of an electrical connector which forms part of a moving contact assembly shown in FIG. 6.
Figure 6:
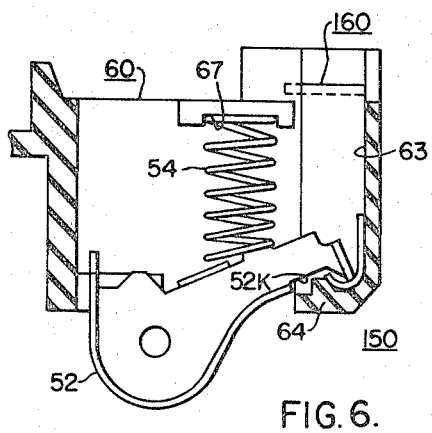
FIG. 6 is a view, partly in side elevation and party in section of a moving contact assembly illustrating a second embodiment of the invention.
Figure 8:
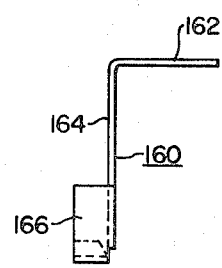
FIG. 8 is a view in side elevation of the electrical connector shown in FIG. 7.

Referring now to FIGS. 6, 7 and 8, there is illustrated a second embodiment of the invention in a movable secondary disconnecting contact assembly 150 which is the same as the movable contact assemblies 50 previously described in detail except that an additional electrically conducting connector 63 is disposed in each opening 66 adjacent to the end of each contact member 52 which is pivotally supported. More specifically, the electrical connector 160 includes an upper portion, as viewed in FIGS. 6 and 7 and as indicated at 162 having an opening 168 which is adapted to receive a terminal screw rather than a crimped or brazed electrical connection, as previously disclosed. The upper portion 162 of the connector 160 is adapted to fit into one of a plurality of spaced recesses 61 provided in the insulating support 60, as best shown in FIG. 5. The intermediate portion 164 of the electrical connector 160 is adapted to be disposed in a recess 63 which extends from the recess 61 downwardly, as viewed in FIG. 6 to a point adjacent to the projecting portion 64 which is formed integrally with the insulating support 60. The electrical connector 160 also includes a generally arcuate or U-shaped portion 166 which extends underneath one end of the associated contact member 52, as shown in FIG. 6, and acts as a pivot support for the associated contact member since the U-shaped portion 166 engages the end portion 52H of the contact member 52 which would otherwise bear against the projecting portion 64 of the insulating housing 60. The balance of the movable contact assembly 150 is the same as previously described in detail in connection with the movable contact assemblies 50. It is to be noted that an electrical current path extends from each contact member 52 through the electrical connector 160 to the upper portion 162 which is adapted to receive one or more associated control conductors which may be removably secured to the upper portion 162 by a conventional terminal screw which the upper portion 162 is adapted to receive. It is also to be noted that the biasing means, more specifically the compression spring 54 has an additional function in the movable contact assembly 150 since the spring 54 additionally functions to bias the right end of the contact member 52, as viewed in FIG. 6, into engagement with the generally arcuate portion 166 of the electrical connector 160 in order to insure an efficient current transfer between the movable contact member 52 and the associated electrical connector 160.

Figure 9:
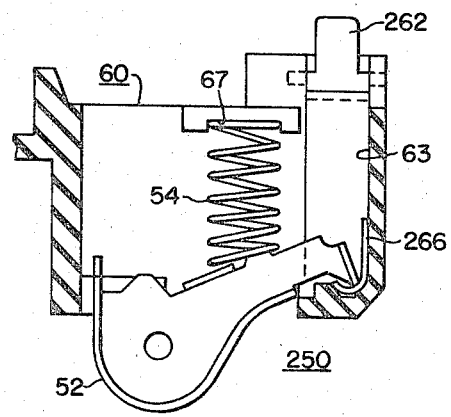
FIG. 9 is a partial view, partly in side elevation and partly in section, of a moving contact assembly illustrating an additional embodiment of the invention.
Figure 10:
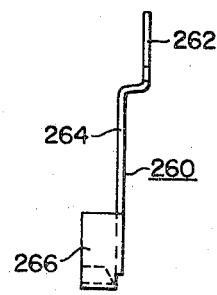
FIG. 10 is a view in side elevation of an electrical connector which forms part of the moving contact assembly shown in FIG. 9.

Referring now to FIGS. 9 an 10, there is illustrated a third embodiment of the invention in a movable disconnecting contact assembly 250 which is the same as the movable contact assemblies 50 previously described except that an additional electrical connector 260 is disposed in each opening 66 of the insulating housing 60 adjacent to the end of the associated movable contact member 52 which would otherwise be pivotally supported directly on the projecting portion 64 of the insulating housing 60. Similarly, to the electrical connector 160, the electrical connector 260 includes an upper tab portion 262 which is adapted to project out of the associated adjacent recess 61 and is adapted to cooperate with an electrical connector of the push-on type, where desired in a particular application, rather than with a crimped or brazed connection, as previously disclosed in connection with the movable contact assembly 50. The electrical connector 260 also includes an intermediate portion 264 which is adapted to be disposed in the adjacent recess 63 provided in the insulating housing 60 and includes a lower generally arcuate or U-shaped portion 266 which is adapted to pivotally support the associated movable contact member 52 adjacent to one end rather than having the movable contact member 52 directly supported by the associated insulating housing, as disclosed in connection with movable contact assemblies 50. Similar to the movable contact assembly 150, an electrical current path is formed between the movable contact member 52 and the electrical connector 260 at the U-shaped portion 262 with sufficient contact pressure being provided by the biasing means 54 which again has an additional function of biasing the contact member 52 into engagement with the associated electrical connector 260 to thereby maintain the parts of the movable contact assembly 250 in assembled relationship. It is to be noted that the operation of the movable contact assemblies 150 and 250 would be the same as the operation of the movable contact assemblies 50 previously described in detail.

Figure 11:
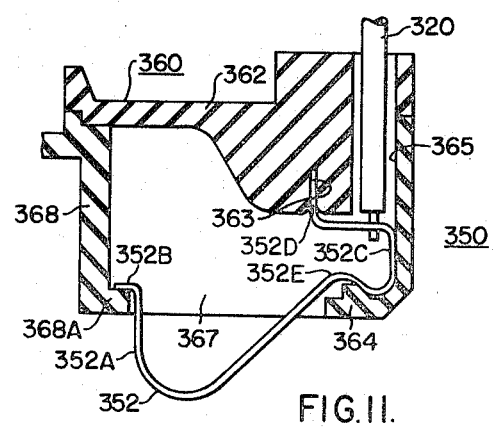
FIG. 11 is a partial view of a moving contact assembly, partly in side elevation and partly in section, illustrating still another embodiment of the invention.

Referring now to FIG. 11 there is illustrated a fourth embodiment of the invention in a movable disconnecting contact assembly 350 which is similar to the movable contact assemblies 50 previously described except that the movable contact assembly 350 does not require a separate biasing means in each opening of the insulating support or housing 360 provided. More specifically, the movable contact assembly 350 includes an insulating support or housing which includes a base member 368 and a cover member 362 which may be secured together by suitable means, such as bolts or screws, where desired in a particular application. Similarly to the insulating support 60 previously described in detail, the insulating housing 360 includes a plurality of recesses 367 which are disposed in side-by-side relation between the sidewalls of the insulating support 360 similarly to the insulating support 60 previously described. One or more movable contact members 352 may be disposed in the openings 367 of the insulating support 360, as shown in FIG. 11. The contact member 352 is preferably formed from an electrically conducting material having spring type characteristics, such as phosphorus-bronze, in order to eliminate the need for a separate biasing means to establish contact pressure between the movable contact member 352 and the associated stationary contact members which may be of the same type, as previously described in connection with the stationary contact assembly 30. The contact member 352 includes a generally arcuate or curved contact portion 352A adjacent to one end thereof. The other end of the contact member 352 includes a loop portion 352C which is disposed inside the recess 367 with the free end of the contact member 352, as indicated at 352D, projecting into a recess 363 provided in the lower surface of the cover member 362 as shown in FIG. 11. In order to permit pivotal movement of the contact member 352 when the movable contact assembly 350 engages the associated stationary contact assembly, the insulating housing 360 includes a projecting portion as indicated at 364 which bears against a generally arcuate portion 352E of the contact member 352. The left end of the contact member 352 includes a tab or projecting portion 352B which is provided to limit the pivotal movement of the contact member 352 during the operation of the overall switchgear equipment in which the movable contact assembly 350 is incorporated since the tab portion 352B engages a projecting portion 368A of the insulating housing 360 when the movable contact assembly 350 is in a position which corresponds to the withdrawn or disconnect position of the associated circuit breaker unit.

It is to be noted that when the contact member 352 of the movable contact assembly 350 is assembled with the associated insulating support 360, the contact member 352 may be assembled in the base member 368 as a first step and then a cover member 362 may then be assembled with the base member 368 as shown in FIG. 11 with the contact member 352 being charged or deflected, considered as a spring member, in order to provide sufficient contact pressure between the movable contact member 352 and the associated stationary contact members which may be of the type described in detail in connection with the stationary contact assembly 30 previously described. It is also to be noted that the control conductors associated with the movable contact assembly 350 may be brazed or crimped to the contact member 352 adjacent to the end of said contact member which is pivotally supported and that the associated control conductors, as indicated at 320 in FIG. 11, will not be required to move to any extent during the operation or pivotal movement of the contact member 352. It is to be noted that in the operation of the movable contact assembly 350, the left end of the movable contact member 352 will move upwardly until the tab portion 352B no longer engages the projecting portion 368A of the base member 368 when the contact members 352 engage the associated stationary contact members during the operation of the movable contact assembly 350.

It is to be understood that in certain applications, the stationary contact assembly 30 and the respective associated movable contact assemblies 50, 150, 250 or 350 may be interchanged in a particular application with the contact assembly 30 being relatively movable where desired and with the contact assemblies 50, 150, 250 or 350 being relatively stationary where desired in a particular application. It is also to be understood that the left end of the contact member 352 shown in FIG. 11 may be modified to include laterally projecting portions similarly to the contact member 52 with the adjacent housing also modified to be similar to the insulating support 60.

The apparatus embodying the teachings of this invention has several advantages. For example, a movable contact assembly as disclosed is relatively simple in construction and is more compact than known movable contact assemblies of the same general type. In addition, the electrical connections to the movable contact assembly are made to a portion of each movable contact member adjacent to the portion of each contact member which is pivotally supported in order to minimize the movement or flexing of the associated control conductors. A further advantage of the disclosed disconnecting contact assemblies is that the different constructions disclosed lend themselves to convenient and easy assembly since, for example, each movable contact member may be readily inserted through the associated opening 66 and the associated biasing spring assembled in back of the associated contact member through the same opening 66 and then actuated by a simple tool to the final assembled position. A final important advantage of the invention is that the effective lever arm associated with the forces acting on each movable contact member is reduced to thereby reduce the corresponding friction on said contact member due to engagement with the associated stationary contact members during movements of the complete circuit breaker unit.

Since numerous changes may be made in the above-described apparatus and different embodiments of the invention may be made without departing from the spirit and scope thereof, it is intended that all the matter contained in the foregoing description or shown in the accompanying drawings shall be interpreted as illustrative and not in a limiting sense.

I claim:

1. A disconnecting contact assembly comprising an insulating support having a plurality of spaced openings extending therethrough and disposed in side-by-side relation, an electrically conducting contact member disposed partially in at least one of said openings, said contact member pivotally supported adjacent to one end by a portion of said insulating support, said other end of said contact member including a generally arcuate contact portion extending externally of said insulating support, biasing means disposed in the same opening as said contact member for biasing the contact portion outwardly from the associated opening and means projecting from said contact member to engage an additional portion of said insulating support in at least one operating position to thereby limit the outward movement of said contact portion under the influence of said biasing means.

2. The combination as claimed in claim 1 wherein the biasing means comprises a spring having one end disposed to bear against an intermediate portion of said contact member and the other end disposed to bear against a further portion of said insulating support.

3. The combination as claimed in claim 1 wherein the insulating support includes a pair of spaced, integral lug portions for guiding electrical connections to the contact members.

4. A contact assembly comprising an insulating support having a plurality of spaced openings extending therethrough and disposed in side-by-side relation, and conducting contact member disposed in one of said openings and projecting outwardly therefrom, an electrically conducting terminal member disposed in said one of said openings and projecting out of the opening, said terminal member including a portion for pivotally supporting said contact member adjacent to one end thereof, said other end of said contact member including a generally arcuate contact portion extending externally of said insulating support, biasing means disposed in the same opening as said contact member for biasing the contact portion outwardly from said opening and means projecting from said contact member for engaging an additional portion of said insulating support in at least one operating position to limit the outward movement of said contact member under the influence of said biasing means.

5. The combination as claimed in claim 4 wherein a portion of said terminal member which projects out of said opening is adapted to receive a terminal screw.

6. The combination as claimed in claim 4 wherein a portion of said terminal member which projects out of said opening is formed as a tab member and is adapted to receive a push-on type connector.

7. The combination as claimed in claim 4 wherein the biasing means comprises a spring having one end disposed to bear against an intermediate portion of said contact member and the other end disposed to bear against a further portion of said insulating support.

UNITED STATES PATENT OFFICE
CERTIFICATE OF CORRECTION

Patent No. 3,553,407     Dated January 5, 1971

Inventor(s) Richard Hauser

It is certified that error appears in the above-identified patent and that said Letters Patent are hereby corrected as shown below:

Column 9, line 38, after "member" insert -- being --.
Column 10, line 16, "and" should read -- an electrically --.

Signed and sealed this 15th day of June 1971.

(SEAL)
Attest:

EDWARD M. FLETCHER, JR.         WILLIAM E. SCHUYLER, JR.
Attesting Officer                Commissioner of Patents